(12) United States Patent
Zhang et al.

(10) Patent No.: US 11,906,692 B2
(45) Date of Patent: Feb. 20, 2024

(54) NUCLEAR LOGGING TOOLS AND APPLICATIONS THEREOF

(71) Applicant: CHINA PETROLEUM & CHEMICAL CORPORATION, Beijing (CN)

(72) Inventors: Jeremy Zhang, Houston, TX (US); Sheng Zhan, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 0 days.

(21) Appl. No.: 17/333,834

(22) Filed: May 28, 2021

(65) Prior Publication Data

US 2022/0252753 A1    Aug. 11, 2022

Related U.S. Application Data

(60) Provisional application No. 63/148,571, filed on Feb. 11, 2021, provisional application No. 63/148,573, filed on Feb. 11, 2021.

(51) Int. Cl.
*G01V 5/10* (2006.01)
*G01V 5/04* (2006.01)
*E21B 47/017* (2012.01)
*E21B 49/00* (2006.01)

(52) U.S. Cl.
CPC ............ *G01V 5/102* (2013.01); *E21B 47/017* (2020.05); *E21B 49/00* (2013.01); *G01V 5/045* (2013.01); *G01V 5/105* (2013.01)

(58) Field of Classification Search
CPC ....... G01V 5/102; G01V 5/045; E21B 47/017
See application file for complete search history.

(56) References Cited

U.S. PATENT DOCUMENTS

| 4,122,339 A | 10/1978 | Smith, Jr. et al. |
| 5,327,773 A * | 7/1994 | Nishimura ............. E21B 43/24 |
| | | 73/30.01 |

(Continued)

FOREIGN PATENT DOCUMENTS

| CN | 101501531 A | 8/2009 |
| CN | 108643890 A | 10/2018 |

(Continued)

*Primary Examiner* — David P Porta
*Assistant Examiner* — Gisselle M Gutierrez
(74) *Attorney, Agent, or Firm* — NKL Law; Allen Xue

(57) ABSTRACT

A nuclear logging tool has a housing, one or more neutron sources, one or more shields, and two or more detectors disposed about the housing. Each of the one or more neutron sources is configured to generate neutrons in pulses or continuously and each of the two or more detectors is operable to detect neutrons and gamma rays. The two or more detectors include a first detector disposed at a first distance from a first neutron source and a second detector disposed at a second distance from the first neutron source. The first distance is shorter than the second distance. The first distance and the second distance is measured in the longitudinal direction of the housing. Each shield is operable to absorb neutrons and gamma rays and is disposed inside the housing between one of the one or more neutron source and one of the one or more detectors.

14 Claims, 9 Drawing Sheets

(56) References Cited

U.S. PATENT DOCUMENTS

| | | | |
|---|---|---|---|
| 5,349,184 A * | 9/1994 | Wraight | G01V 5/107 250/269.4 |
| 5,521,378 A | 5/1996 | Roscoe et al. | |
| 7,525,100 B2 | 4/2009 | Kraemer et al. | |
| 7,633,058 B2 | 12/2009 | Stoller et al. | |
| 7,910,894 B2 | 3/2011 | Kraemer et al. | |
| 8,598,510 B2 | 12/2013 | Zhang et al. | |
| 8,637,807 B2 * | 1/2014 | Evans | G01V 5/14 250/269.2 |
| 8,849,573 B2 | 9/2014 | Zhang et al. | |
| 9,012,836 B2 | 4/2015 | Wilson et al. | |
| 9,477,006 B2 | 10/2016 | Zhou et al. | |
| 9,835,759 B2 | 12/2017 | Grau | |
| 10,061,056 B2 | 8/2018 | Moake | |
| 10,379,253 B2 | 8/2019 | Zhou et al. | |
| 2006/0075223 A1 | 4/2006 | Bade et al. | |
| 2006/0192096 A1 | 8/2006 | Radtke et al. | |
| 2008/0308720 A1 | 12/2008 | Ferguson | |
| 2009/0045329 A1 * | 2/2009 | Stoller | G01V 5/10 250/269.4 |
| 2011/0112810 A1 | 5/2011 | Scoullar et al. | |
| 2012/0126106 A1 | 5/2012 | Zhou et al. | |
| 2012/0197529 A1 * | 8/2012 | Stephenson | G01V 5/101 250/269.6 |
| 2012/0326048 A1 | 12/2012 | Nikitin et al. | |
| 2013/0206972 A1 | 8/2013 | Zhou et al. | |
| 2013/0264486 A1 * | 10/2013 | Bingham | G01V 5/0033 250/391 |
| 2014/0001350 A1 | 1/2014 | Beekman et al. | |
| 2014/0339410 A1 * | 11/2014 | Zhou | G01V 5/101 250/256 |
| 2014/0343856 A1 | 11/2014 | Zhou et al. | |
| 2016/0024909 A1 | 1/2016 | Han et al. | |
| 2016/0154141 A1 | 6/2016 | Moake | |
| 2016/0349399 A1 * | 12/2016 | Zhou | G01V 5/102 |
| 2017/0045639 A1 * | 2/2017 | Zhou | G01V 5/101 |
| 2017/0176635 A1 | 6/2017 | Kramer | |
| 2017/0211382 A1 | 7/2017 | Jacobson et al. | |
| 2017/0315260 A1 * | 11/2017 | Stoller | G01V 5/104 |
| 2017/0362931 A1 | 12/2017 | Homan et al. | |
| 2018/0164469 A1 * | 6/2018 | Kuespert | G01T 1/20 |
| 2018/0172876 A1 | 6/2018 | Inanc et al. | |
| 2018/0231683 A1 * | 8/2018 | Teague | G01V 5/08 |
| 2019/0025454 A1 | 1/2019 | Galford | |
| 2022/0252755 A1 | 8/2022 | Zhan et al. | |

FOREIGN PATENT DOCUMENTS

| | | |
|---|---|---|
| CN | 110454147 A | 11/2019 |
| CN | 110612463 A | 12/2019 |
| WO | 2012064797 A2 | 5/2012 |
| WO | 2013148998 A1 | 10/2013 |

* cited by examiner

200

A-A  B-B  C-C  D-D

A-A  B-B  C-C  D-D

NUCLEAR LOGGING TOOLS AND APPLICATIONS THEREOF

RELATED APPLICATIONS

This application claims the benefit of priority under 35 U.S.C. § 119 to U.S. Provisional Application No. 63/148,571, filed on Feb. 11, 2021, and U.S. Provisional Application No. 63/148,573, filed on Feb. 11, 2021, the entire contents of which are incorporated herein by reference.

BACKGROUND

1. Field of Technology

This disclosure provides methods and systems for nuclear well logging and formation evaluation, in particularly methods and systems for nuclear logging and data analysis to obtain formation parameters.

2. Description of Related Art

In oil and gas exploration, porosity, mineralogy, density, and gas/oil saturation are important formation parameters for evaluating the total oil/gas reserves in a field. Various wireline and LWD (Logging-While-Drilling) logging tools have been developed for the measurement of downhole formation parameters.

Formation density is obtained by measuring back-scattered gamma rays from a gamma radiation source (e.g., a Cs-137 source) received at two detectors (e.g., two NaI scintillation detectors) placed at different distances from the gamma ray source. The two detectors are usually referred as the near detector and the far detector according to their relative distances from the gamma ray source.

Neutron porosity logging tools investigate the formation porosity by measuring the ratio of neutron count rates from a near detector to that of a far detector after fast neutrons from an isotope neutron source (e.g., an Am—Be source) have been slowed down by tool surroundings (e.g., wellbore fluid and formation) and scattered back to the detectors. The ratio is then translated to porosity according to the specific formation mineralogy (e.g., sandstone, limestone, or dolomite). Using the ratio of count rates from two detectors reduces the effect of variations in the near-wellbore environment (wellbore fluid, borehole size, etc.) on the porosity measurement.

A pulsed neutron tool employs a pulsed neutron source (e.g., a D-T neutron generator or a D-D neutron generator) and one, two, or three detectors that detect neutrons or neutron-induced gamma rays. The energy spectrum of neutron-induced gamma rays from each element is unique. Therefore, by measuring the energy spectrum of gamma rays from inelastic scatting and/or from neutron capture reactions, one may identify elements and obtain the relative percentage of gamma rays from each of those elements in the formation i.e., the elemental yields. The inelastic spectrum is the basis for the carbon-oxygen (C/O) ratio log but can also provide information on other elements, such as hydrogen (H), silicon (Si), calcium (Ca), iron (Fe), sulfur (S), and chlorine (Cl).

Since the elemental yield logs only provide the relative concentration of elements, they are normally presented as ratios, such as C/O, Cl/H, Si/(Si+Ca), H/(Si+Ca), and Fe/(Si+Ca). These ratios are indicators of oil, salinity, mineralogy, porosity, and clay, respectively. The element yield logs, together with cross sections of neutron inelastic scattering and neutron capture reactions of those elements, can also be used to obtain element concentrations in the formation.

Further, by measuring thermal neutron time-decay curve or capture gamma ray time-decay curve after a neutron pulse or several neutron pulses, one may obtain the macro thermal neutron absorption cross section (sigma) of the formation, which can be utilized to estimate oil/gas saturation.

In most of these applications, neutrons and gamma rays are detected by their respectively detectors/sensors. For example, He-3 gaseous detectors are used to detect thermal neutrons. He-3 isotope has high thermal neutron absorption cross sections. After fast neutrons emitted from a neutron source are slowed down by the formation and scattered back to the detectors, neutrons are absorbed and produce other detectable ions, such as protons (p) and trilliums (T), which ionize the gas. Ions and electrons are multiplied and drifted in an electric field to form electric signals. A variety of scintillation detectors, e.g., NaI, CsI, BGO, GSO, LaBr3, YAP scintillators and photomultiplier tubes (PMTs), are employed to detect gamma rays. These scintillators change the deposited energy of gamma rays into scintillation lights. The PMT converts the scintillation lights into electrons and amplifies them to form electronic signals.

Existing nuclear logging tools usually employ single-function detectors that detect either neutrons or gamma rays. For example, to obtain both formation density and neutron porosity, the traditional way is to combine a density tool and a neutron porosity tool together in the tool string. A density tool may have a gamma ray source and two gamma ray detectors. A neutron porosity tool may have a neutron source and two neutron detectors. As such, two different radiation sources and four radiation detectors would be required for formation density and neutron porosity measurements. To obtain other parameters such as gas saturation may require a third detector. Further, a neutron monitor detector may be needed to monitor the source strength of a neutron generator as the source strength may decrease or fluctuate over time. Accordingly, a nuclear logging tool needs to carry multiple different types of radiation sources and detectors in order to measure multiple formation parameters. Such logging tools have limited use due to high cost, low reliability, and the large size needed to accommodate those multiple sources and detectors inside the tool.

More recently scintillator materials that are sensitive to both neutrons and gamma rays, e.g., $Cs_2LiYCl_6$ (CLYC), $Cs_2LiLaBr_6$ (CLLB), have been developed. By coupling crystals of such a material to scintillation light sensitive components, such as PMTs, one can produce dual-function scintillators that detect both neutrons and gamma rays. Neutrons and gamma rays received by the dual-function detectors can be distinguished from each other using the pulsed shape discrimination (PSD) technique based on the fact an electronic signal from a gamma ray decays faster than from a neutron.

The need exists to reduce the number of radiation sources and detectors and at the same time to improve accuracy and precision of formation parameters obtained by a logging tool in either wireline or LWD environments. The present disclosure provides new logging tools combining neutron sources and dual-function detectors, which opens new areas for nuclear logging, in new logging tools, measurement methods, as well as in new data processing algorithms.

SUMMARY

This summary is provided to introduce a selection of concepts in a simplified form that are further described below in the detailed description. It is not intended to identify key features or essential features of the claimed subject matter, nor is it intended to be used as an aid in determining the scope of the claimed subject matter.

According to one embodiment of this disclosure, a nuclear logging tool has a housing, one or more neutron sources, one or more shields, and two or more detectors disposed about the housing. Each of the one or more neutron sources is configured to generate neutrons in pulses or continuously and each of the two or more detectors is operable to detect neutrons and gamma rays. The two or more detectors include a first detector disposed at a first distance from a first neutron source and a second detector disposed at a second distance from the first neutron source. The first distance is shorter than the second distance. The first distance and the second distance is measured in the longitudinal direction of the housing. Each shield is operable to absorb neutrons and gamma rays and is disposed inside the housing between one of the one or more neutron source and one of the one or more detectors.

According other embodiments, the one or more neutron sources in the nuclear logging tool is independently a Deuterium-Tritium (D-T) neutron generator, a Deuterium-Deuterium (D-D) neutron generator, or a radioisotope neutron source.

According to some embodiments, the nuclear logging tool has a third detector disposed at a third distance from the first neutron source in the longitudinal direction of the housing, and the third distance is larger than the second distance.

According to still other embodiments, each of the two or more detectors has a scintillator made of $Cs_2LiYCl_6$ or $Cs_2LiLaBr_6$, and can detect both neutrons and gamma rays.

According to further embodiments, the nuclear logging tool contains a second neutron source disposed about the housing. The second neutron source is spaced away from the first neutron source in the longitudinal direction of the housing. In some embodiments, the first neutron source is an isotope neutron source and the second neutron source is a pulsed neutron generator, and vice versa.

According to additional embodiments, the two or more detectors are disposed between the first neutron source and the second neutron source in the nuclear logging tool.

In yet other embodiments, the nuclear logging tool contains at least two detectors disposed at substantially the same first distance from the first detector or at substantially the same second distance from the second detector.

According to more embodiments, at least two of the two or more detectors are installed at two different radial directions about the housing and have two different toolface angles when the nuclear logging tool is deployed subterranean formation.

Further, at least one of the detectors is located eccentrically or centric relative to the axis of the logging tool.

In some embodiments, the shield is made of a material that can absorb neutron and gamma rays. The material can be gadolinium (Gd), samarium (Sm), tungsten borides, an alloy containing Gd or Sm, oxides such as $Gd_2O_3$, $Sm_2O_3$, and $B_2O_3$.

In some of the embodiments, the detector has a casing that houses the scintillator crystal and electronics. A portion of the casing can be made of the shield material or a portion of the casing can be covered by the shield material so that neutrons and gamma rays pass the remaining portion of the casing to reach the scintillator crystal.

The disclosure also provides a method for measuring subterranean formation properties. The method includes the steps of deploying the nuclear logging tool into a subterranean formation; causing the one or more neutron sources to emit neutrons into the subterranean formation; converting neutrons and gamma rays from the subterranean formation received by the two or more detectors to electric signals; and analyzing electric signals to obtain a plurality of formation properties.

According to certain embodiments of the method, the nuclear logging tool has a second neutron source disposed about the housing. The second neutron source is spaced away from the first neutron source in the longitudinal direction of the housing, and the one or more detectors are disposed between the first neutron source and the second neutron source.

The method can be used to obtain formation properties including formation density, formation porosity, gas and oil saturation, and/or formation element concentration.

This disclosure further provides a downhole drilling system. It includes a drill string having a bottom hole assembly (BHA) disposed at a lower part thereof, a kelly drive configured to deliver the drill string into a borehole, a top drive configured to rotate the drill string, and a controller. The BHA has a drill bit disposed at an end portion of the BHA, a downhole motor, and a measurement sub configured to measure subterranean formation properties and operational parameters. The nuclear logging tool is installed in the measurement sub.

The disclosure also provides a wireline logging tool, which contains a nuclear logging tool of the current disclosure and an electric cable connect to a piece of equipment on the surface, e.g., a wireline truck.

BRIEF DESCRIPTION OF THE DRAWINGS

The teachings of the present invention can be readily understood by considering the following detailed description in conjunction with the accompanying drawings.

Figure 1A:
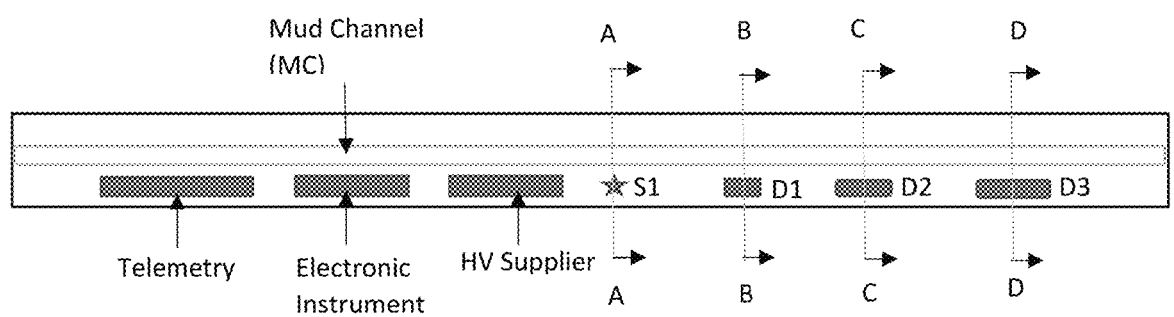
FIG. 1A, FIG. 1B, FIG. 1C, and FIG. 1D illustrate four exemplary configurations of a nuclear logging tool having one neutron source (S1) and three detectors (D1, D2, and D3) disposed along the longitudinal direction of the housing of the tool.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. References are made in detail to embodiments of the present disclosure, examples of which are illustrated in the accompanying drawings. Similar or like reference numbers may be used in the drawings and may indicate similar or like elements.

The features described herein may be embodied in different forms and are not to be construed as being limited to the embodiments described herein. Rather, the embodiments described herein and depicted in the drawings have been provided so that this disclosure will be thorough and complete and will convey the full scope of the disclosure to one of ordinary skill in the art, who may readily recognize from the following description that alternative embodiments exist without departing from the general principles of the disclosure.

Therefore, the scope of the disclosure is defined not by the detailed description, but by the claims and their equivalents, and all variations within the scope of the claims and their equivalents are to be construed as being included in the disclosure.

In this disclosure, unless otherwise noted, a detector in refers to a dual-function detector that can detect both neutrons and gamma rays. Such a detector employs scintillation crystals such as $Cs_2LiYCl_6$ (CLYC) or $Cs_2LiLaBr_6$ (CLLB) and associated electronics, e.g., PMT. The detectors may be actively cooled or not actively cooled when deployed downhole. For example, a detector using CLLB and high-temperature PMT can be used at a high temperature without additional cooling.

FIGS. 1A to 1D are schematic illustrations (not to scale) of four exemplary configurations of a cylindrical nuclear logging tool 200 having a neutron source (S1) and three dual-function detectors (D1, D2, D3) disposed along the housing of the logging tool suitable for logging-while-drilling (LWD) operations. A mud channel (MC) is disposed along the axis of the logging tool while the detectors are eccentrically disposed along the longitudinal direction of the tool. FIG. 1A also shows a high voltage power supply (HV), an electronic instrument, e.g., a controller, for sending instructions, receiving and processing data from the neutron source and the detectors, as well as a telemetry for transmitting data between the logging tool and surface. The high voltage power supply provides power to detectors (D1, D2, D3) and to the pulsed neutron source (S1). The power supply, the electronic instrument, and telemetry are required but not shown in FIGS. 1B-1D for simplicity.

As shown in the figures, D1 is the near detector that has the shortest distance in longitudinal direction to the neutron source, D3 is the far detector having the longest longitudinal distance to the neutron source, and D2 is the middle detector that has a longitudinal distance that is in the middle.

Figure 1B:
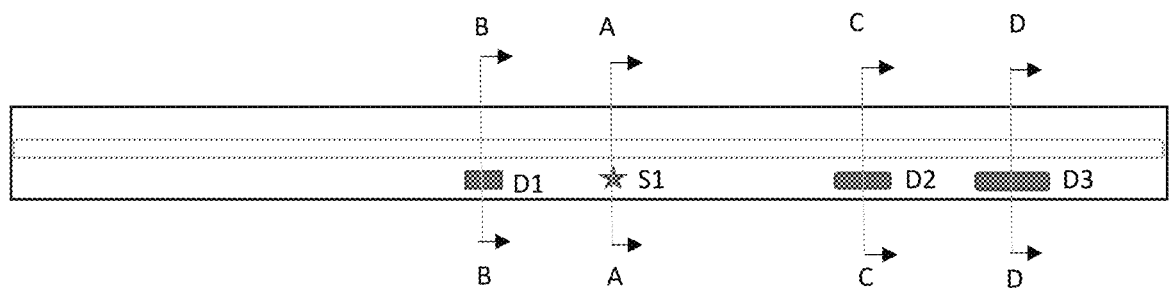
Figure 1C:
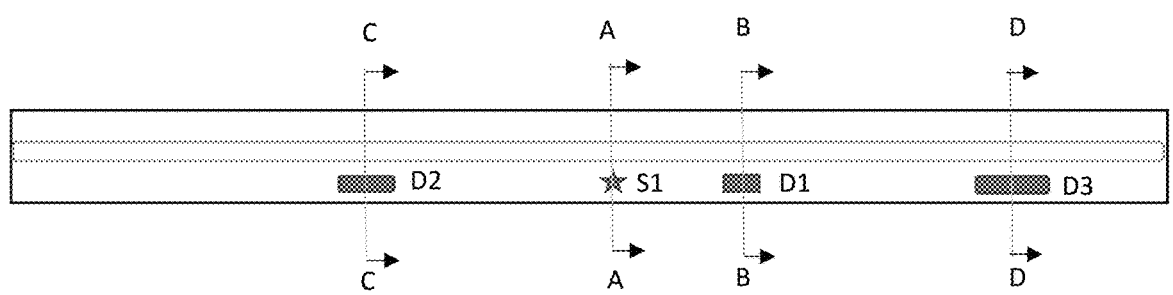
Figure 1D:
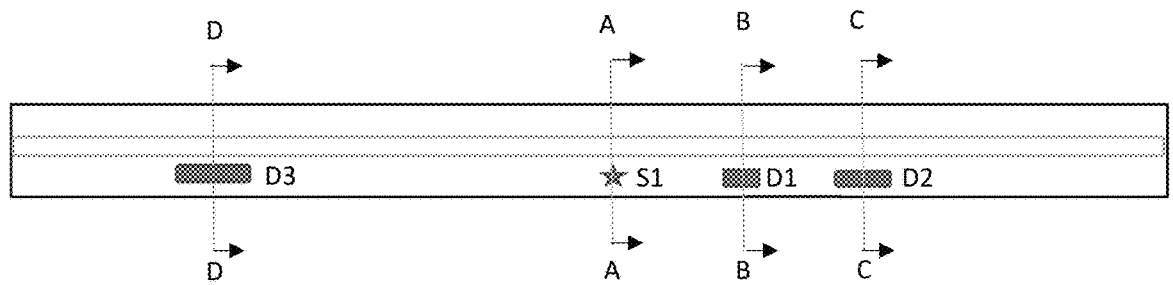

In FIG. 1A, all three detectors reside on one side of the neutron source along the logging tool 200. The one side can be either the proximal side or the distal side of the neutron source. The proximal side is the side of the nuclear logging tool 200 that is closer to the surface when it is deployed downhole while the distal side is farther away from the surface. The high voltage power supply provides power to detectors (D1, D2, D3) and to the pulsed neutron source (S1). The signals from detectors are processed by the electronic instruments and measurements/data are collected and transmitted by telemetry. In FIGS. 1B, 1C, and 1D, both the distal side and the proximal side of the neutron source has at least one detector disposed thereto.

In wireline logging, the tool can be installed in a sonde, which does not contain a mud channel. Detectors can be installed either along or off the axis of the tool body. Power and control signals can also be provided to the logging tool from the surface while data from the logging tool can be transmitted to the surface via the wireline cable.

The neutron source S1 in each logging tool depicted in FIGS. 1A to 1D is a pulsed neutron generator. However, an isotope neutron source can be used as well. The pulsed neutron source may be a Deuterium-Tritium (D-T) pulsed neutron generator, which can be operated in a variety of pulse schematics (e.g., frequency, duty time) in a pulse mode. For example, the frequency of neutron pulses may be about 10 kHz (the period is 100 µs) and the neutron duty time may be about 20 µs. In another embodiment, the frequency of neutron pulses may be about 1 kHz (the period is 1000 µs) and neutron duty time may be 50 µs. Depending on the methods and measurements, the D-T neutron generator may also be operated in a continuous mode. In that case, the neutron generator is activated frequent enough so that neutrons are emitted continuously. Neutrons from a D-T neutron generator has an initial energy of about 14.1 MeV.

The pulsed neutron source may also be a Deuterium-Deuterium (D-D) pulsed neutron generator, which can be operated in different pulse schematics (e.g., frequency, duty time) in pulsed mode. For example, the frequency of neutron pulses may be about 20 kHz (the period is 50 µs) and neutron duty time may be about 20 µs. Alternatively, the frequency of neutron pulses may be about 1 kHz (the period is 1000 µs) and neutron duty time may be 40 µs. Depending on the methods and measurements, the D-D neutron generator may also be operated in a continuous mode. Neutrons from a D-D neutron generator has an initial energy of about 2.5 MeV.

An isotope neutron source, such as Am—Be, Pu—Be, Cf-252, may also be used in the place of the pulsed neutron source, depending on the target formation parameters and measurement methods. Neutrons from these isotope neutron sources have different energy spectra. For an example, the energy of neutrons emitted from an Am—Be source is from 0 MeV to about 10 MeV with an average energy of about 4.2 MeV.

The neutron source S1 and detectors D1, D2, and D3 as depicted in FIGS. 1A-1D only show their relative positions along the longitudinal direction of the housing of the tool 200 but not their positions in the radial direction in a cross-section of the tool housing.

Figure 2A:
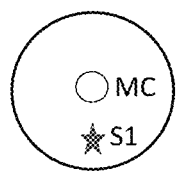
FIG. 2A, FIG. 2B, and FIG. 2C show cross-sectional views of exemplary nuclear logging tools having S1, D1, D2, and D3.
Figure 2A:
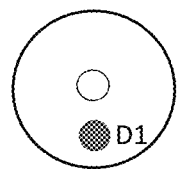
Figure 2A:
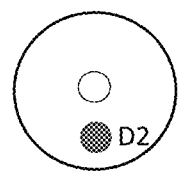
Figure 2A:
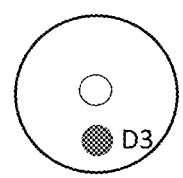
Figure 2B:
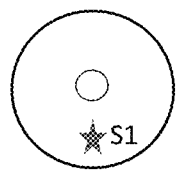
Figure 2B:
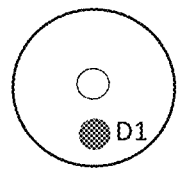
Figure 2B:
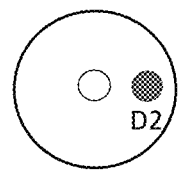
Figure 2B:
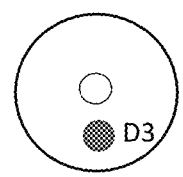
Figure 2C:
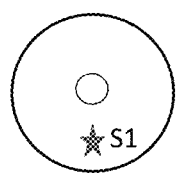
Figure 2C:
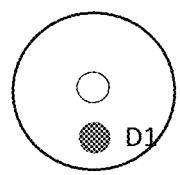
Figure 2C:
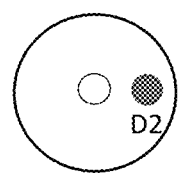
Figure 2C:
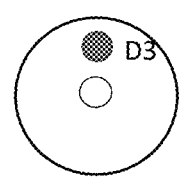

In certain embodiments, S1, D1, D2, and D3 can be disposed at the same radial or different directions, i.e., having the same or different toolface angles when deployed in the formation. FIGS. 2A, 2B, and 2C show exemplary cross-sectional views in the directions of A-A, B-B, C-C, and D-D as shown in FIGS. 1A to 1D. S1, D1, D2, and D3 in FIG. 2A are disposed at same toolface angle. In FIG. 2B, however, S1, D1, and D3 have the same toolface angle while D2 is at a different toolface angle. In FIG. 2C, S1 and D1 have the same toolface angle while each of D2 and D3 has a different toolface angle.

Figure 3A:
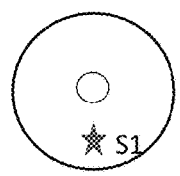
FIG. 3A and FIG. 3B show cross-sectional views of exemplary nuclear logging tools having four and five detectors, respectively.
Figure 3A:
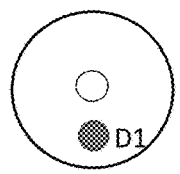
Figure 3A:
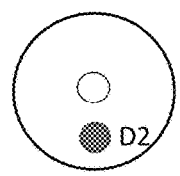
Figure 3A:
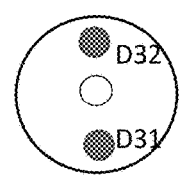
Figure 3B:
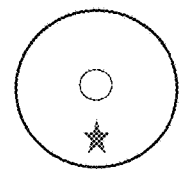
Figure 3B:
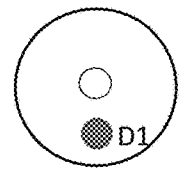
Figure 3B:
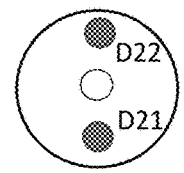
Figure 3B:
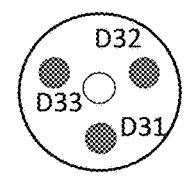

Other embodiments of the logging tool may have more than three detectors. For example, FIG. 3A depicts a variation of the logging tool in FIG. 1A that has four detectors—D1, D2, D31, and D32. D31 and D32 have approximately the same distance from S1 but are disposed at two different toolface angles. Likewise, FIG. 3B depicts another variation of tool in FIG. 1A, which has six detectors—D1, D21, D22, D31, D32, and D33. In this embodiment, D21 and D22 are disposed opposite to each other on the cross-sectional area of the logging tool, i.e., the toolface angle of D21 and D22 is 0° and 180°, respectively. D31, D32, and D33 are disposed 120° apart on the cross-sectional area of the logging tool, i.e., a difference in the toolface angles of any two among D31, D32, and D33 is 120°. Having different toolface angles allows detectors to preferentially receive neutrons and gamma-rays at certain incident angles from the formation. It also increases the detection efficiency of neutrons and gamma rays by increasing the total count rate of all the detectors.

Further, in FIG. 3A, D31 and D32 in have substantially the same distance from S1. In FIG. 3B, middle detectors D21 and D22 have substantially the same distance from S1 while far detectors D31, D32, and D33 have substantially the same distance from S1. "Substantially the same distance" means the distances from S1 to the center of scintillators of the detectors (e.g., D31 and D32) is about the same. For example, the difference is less than ½" or ¼". By this arrangement, the middle detectors as a whole and far detectors as a whole have higher count rates than when one only middle detector or only one far detector is used. Accordingly, the neutron generator S1 can be of a less powerful source, which may not be subject to stringent regulations as more powerful neutron sources are subject to. In addition, the count rate of individual detectors can separately be recorded and processed. The differences of various detectors in distance and in toolface angles can be used to obtain formation information in specific azimuthal directions.

In some embodiments, the logging tool 200 have multiple shields that can absorb neutrons and gamma-rays (not shown). The shields can be placed in the logging tool between the neutron source and the detectors so that the detectors receive neutrons and gamma-rays coming from the formation rather than traveling through the logging tool itself. Alternatively, the detectors can also be partially shielded by the shield material that absorb neutrons and gamma rays from certain directions.

The shield is made of or contains one or more materials that can effectively attenuate both thermal neutrons and gamma rays. The shield material can contain materials chosen from heavy elements having high thermal neutron absorption cross sections, including metals such as gadolinium (Gd), samarium (Sm), metal oxides such as $Gd_2O_3$, $Sm_2O_3$, $B_2O_3$, alloys containing Gd or Sm with other heavy metals Fe, Pb, or W, or materials containing boron, such as tungsten borides (WB, $WB_2$, etc.).

The shield may be a stand-alone metal piece inserted in the logging tool, or an integral part of the detector casing. For example, the portion of the detector casing facing inward to the logging tool can be made of the shield material while the portion facing the formation is made of a material that is transparent to neutrons and gamma rays, forming a window that neutrons and gamma rays can travel through. As such, neutrons and gamma-rays from certain incident angles may be absorbed by the shield material while those travel through the window are received by the detector. Therefore, the detector can be more sensitive to certain incident angles by adjusting the size and orientation of the window in the detector casing. During operation, data collected by various detectors may produce direction-specific formation properties, which can be used to guide directional drilling.

Figure 4A:
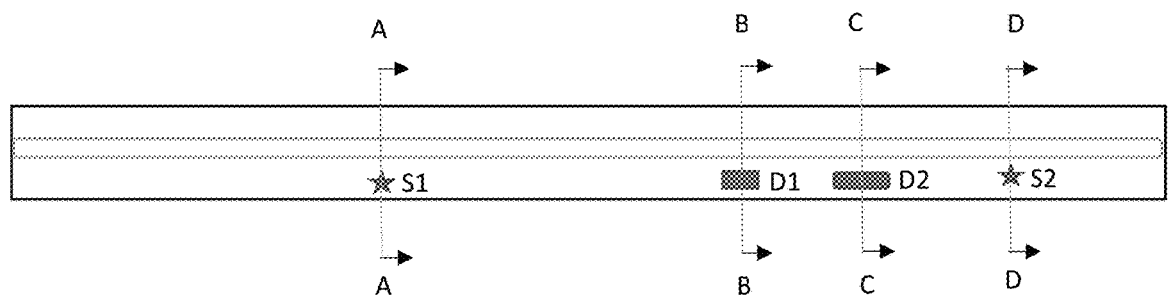
FIG. 4A is an embodiment of the nuclear logging tool having two neutron sources (S1, S2) and two detectors (D1, D2)

The nuclear logging tool may have more than one neutron sources. FIG. 4A shows a further embodiment of the logging tool having two neutron sources (S1 and S2), one at the proximal end and the other at the distal end while two detectors (D1 and D2) are arranged between S1 and S2. Alternatively, S1 and S2 can be arranged in tandem and disposed near one end of the logging tool while D1 and D2 arranged in tandem near the other end, as the engineering considerations require. In both embodiments, the distance between S1 and D1 is $d_1$, the distance between S1 and D2 is $d_2$, the distance between S2 and D2 is $d_3$, while the distance between S2 to D1 is $d_4$. When S1 and S2 are both pulsed neutron generators, they can be alternately turned ON or OFF, thereby inducing neutrons and gamma-rays from the formation alternately, which are received by D1 and D2. Since there are four different source-to-detector distances ($d_1$ to $d_4$), the data generated in D1 and D2 may be better compensated than tools with only two or three source-to-detector distances for near wellbore effects, such as borehole size, tool standoff, mud weight and/or salinity, casing size, cement thickness, etc. As a result, the obtained formation parameters could be more accurate.

Figure 4B:
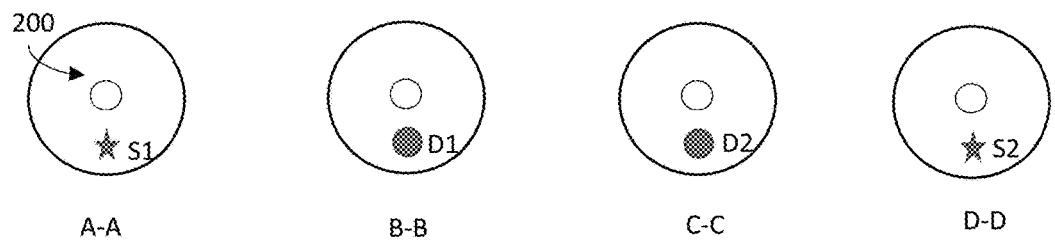
FIG. 4B and FIG. 4C provide cross-sectional views of exemplary configurations of this embodiment.
Figure 4C:
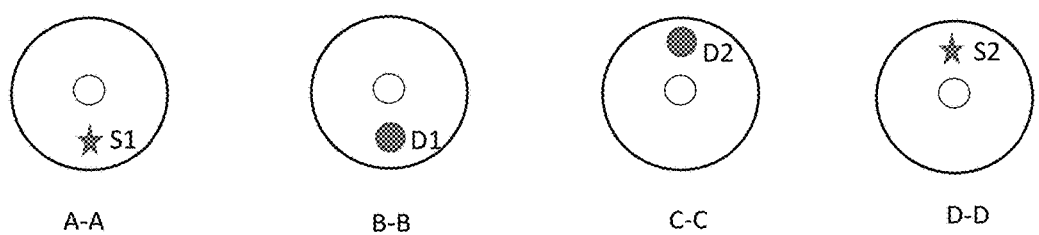

FIG. 4B and FIG. 4C illustrate two exemplary embodiments of this design, where the two sources and two detectors can be arranged in same toolface angle or in different toolface angles. When, as in FIG. 4B, the sources and detectors have the same toolface angle, the measurement covers the same sector in the formation at any given time. When, as in FIG. 4A, the sources and detectors may have different toolface angles, the data generated in D1 and D2 reflect different sectors of the formation, which can reveal differences amongst various formation sectors at any given time by comparing the measurements from D1 and D2.

Figure 5A:
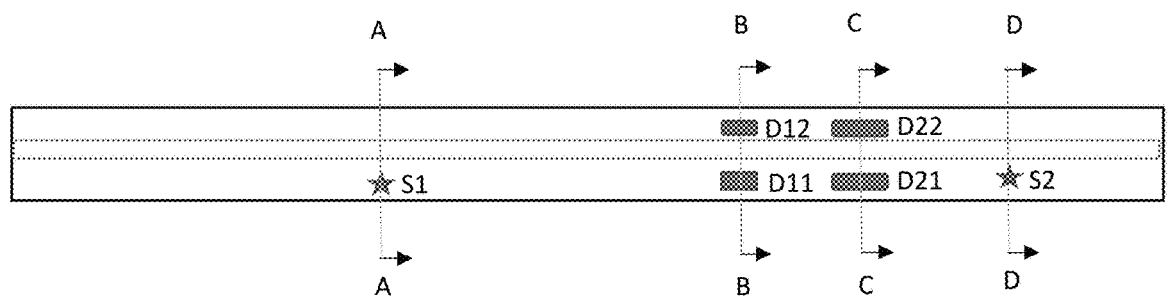
FIG. 5A is a further exemplary embodiment of the nuclear logging tool having two neutron sources (S1, S2) and four detectors (D11, D12, D21, D22)
Figure 5B:
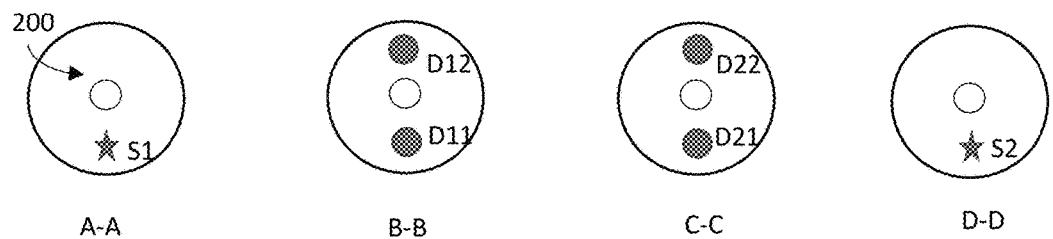
FIG. 5B provides cross-sectional views of this embodiment.

FIGS. 5A and 5B illustrate a logging tool that has four detectors (D11, D12, D21, D22) and two neutron sources (S1 and S2). Note that the pair of detectors D11 and D12 (as well as D21 and D22) are disposed at substantially the same distance from S1 or S2. As indicated before, having more than one detectors at a certain distance increase the count rate at that distance so that a less powerful neutron source may be viable. The count rate of one far detector may be too low to provide reliable measurement data. By using two or more far detectors, the count rate can be significantly increased so that reliable measurement results can be obtained by processing data from the multiple far detectors as a whole.

In some embodiments, S1 and S2 can be turned ON or OFF simultaneously. Doing so increases the count rate of D1 and D2, thereby reducing the statistical measurement uncertainty.

In still another embodiment, S1 and S2 are both isotope neutron sources. Compared with pulsed neutron sources, isotope neutron sources do not need power supply so that the logging tool can be more compact. Moreover, the isotope neutron source has a longer lifetime and is more reliable. For example, the half-life of an isotope Am—Be neutron source has a half-life of 432 years, much longer than the average tube lifetime of a neutron generator of 500 hours to 4000 hours.

In yet another embodiments, S1 and S2 can be two different types of neutron sources. For example, S1 can be a D-T neutron generator while S2 can be an Am—Be neutron source. In the field, the D-T neutron generator can be turned off, leaving the Am—Be neutron source working by itself to perform the neutron porosity log. Alternatively, the Am—Be neutron source can be taken out from the logging tool so that the D-T neutron generator alone emits neutron pulses into the surrounding formation. In this case, one may obtain the neutron porosity log as well as other measurements (density, oil and gas saturation, etc.) using the D-T neutron generator.

The porosity logs obtained using the Am—Be source and the D-T source differ slightly. By comparing these porosity logs of the same well obtained using two different neutron sources, one may obtain the correlation between these two logs. As historical porosity logs were mainly obtained using isotope neutron sources, such correlations may help updating the historical porosity logs so that they become comparable with new logs obtained using pulsed neutron sources. Likewise, the new pulsed neutron porosity logs can be converted to match historical porosity logs to continuously use the reservoir models already built using historical logs in production predictions.

Figure 6:
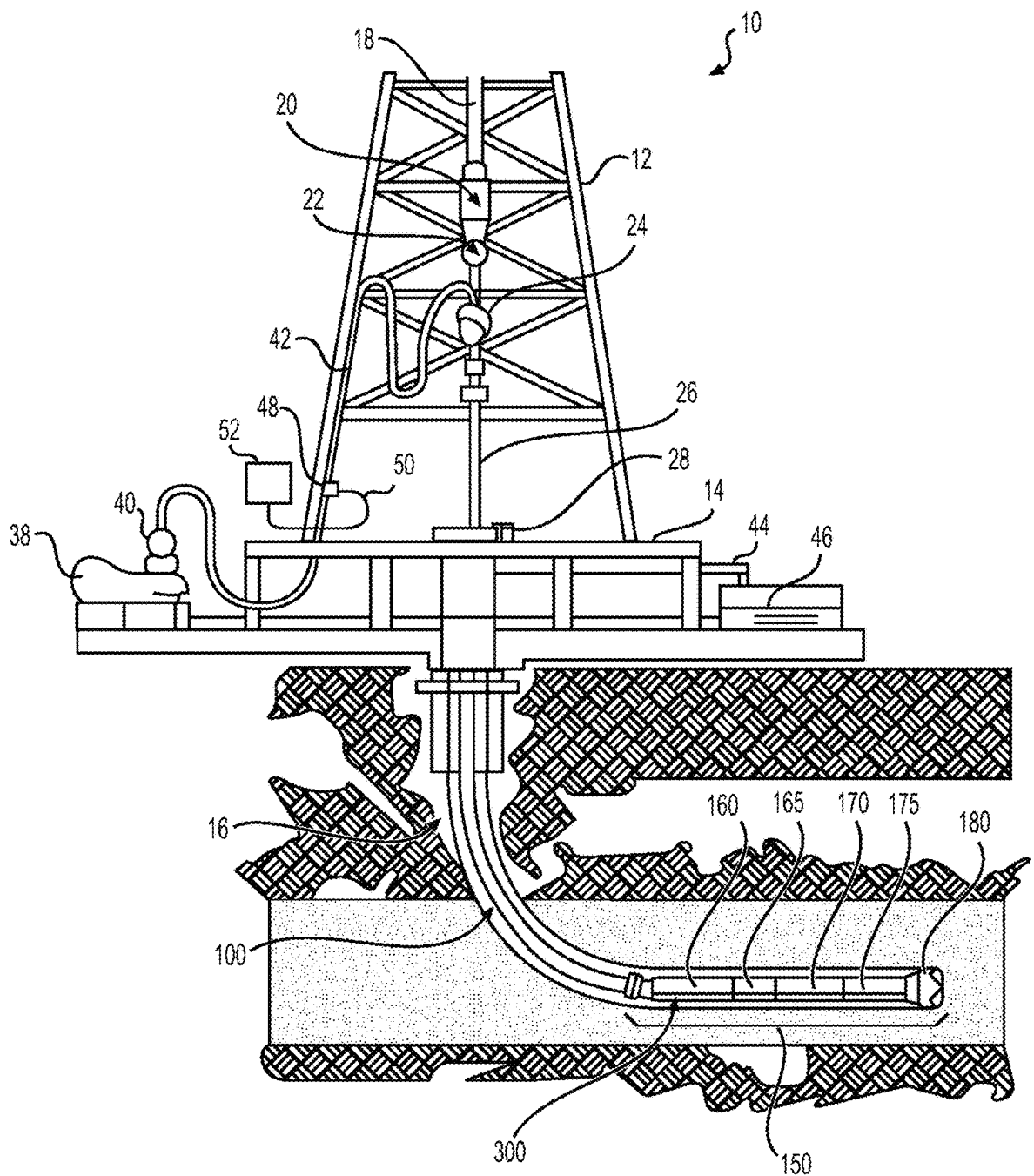
FIG. 6 is a block diagram of an exemplary drilling system that implements an embodiment of the current disclosure.

The logging tool 200 can be a part of a wireline logging tool or be included in a downhole assembly as a LWD logging tool in a drilling operation. FIG. 6 is a diagram of an oil drilling system 10 used in the directional drilling of borehole 16. The oil drilling system 10 may be used for drilling on land as well as beneath the water. The borehole 16 is drilled into the earth formation using a rotary drilling rig that includes a derrick 12, drill floor 14, draw works 18, traveling block 20, hook 22, swivel joint 24, kelly joint 26 and rotary table 28. A drill string 100 includes a plurality of drill pipes that are serially connected and secured to the bottom of the kelly joint 26 at the surface. The rotary table 28 is used to rotate the entire drill string 100 while the draw works 18 is used to lower the drill string 100 into the bore hole 16 and apply controlled axial compressive loads. The bottom whole assembly 150 is disposed at the distal end of the drill string 100.

The drilling fluid (also referred to as mud) is usually stored in mud pits or mud tanks 46, and is transferred using a mud pump 38, which forces the drilling fluid to flow through a surge suppressor 40, then through a kelly hose 42, and through the swivel joint 24 and into the top of the drill string 100. The drilling fluid flows through the drill string 100 at about 150 gallons per minute to about 600 gallons per minute and flows into the bottom whole assembly 150. The drilling fluid then returns to the surface by traveling through the annular space between the outer surface of the drill string 100 and the bore hole 16. When the drilling fluid reaches the surface, it is diverted through a mud return line 44 back to the mud tanks 46.

The pressure required to keep the drilling fluid in circulation is measured by a pressure sensitive transducer 48 on the kelly hose 42. The pressure sensitive transducer detects changes in pressure caused by the pressure pulses generated by a pulser. The magnitude of the pressure wave from the pulser may be up to 500 psi or more. The measured pressure is transmitted as electrical signals through transducer cable 50 to a surface computer 52, which decodes and displays the transmitted information. Alternatively, the measured pressure is transmitted as electrical signals through transducer cable 50 to a decoder which decodes the electrical signals and transmits the decoded signals to a surface computer 52 which displays the data on a display screen.

As indicated above, the lower part ("distal part") of the drill string 100 includes the bottom hole assembly (BHA) 150, which includes a non-magnetic drill collar with a MWD system (MWD assembly or MWD tool) 160 installed therein, logging-while drilling (LWD) instruments sub 165 containing LWD instruments, a downhole motor 170, a near-bit measurement sub 175, and the drill bit 180 having drilling nozzles (not shown). The drilling fluid flows through the drill string 100 and is output through the drilling nozzles of the drill bit 180. During the drilling operation, the drilling system 10 may operate in the rotary mode, in which the drill string 100 is rotated from the surface either by the rotary table 28 or a motor in the traveling block 20 (i.e., a top drive). The drilling system 10 may also operate in a sliding mode, in which the drill string 100 is not rotated from the surface but is driven by the downhole motor 170 rotating the drill bit 180. The drilling fluid is pumped from the surface through the drill string 100 to the drill bit 180, being injected into an annulus between the drill string 100 and the wall of the bore hole 16. The drilling fluid carries the cuttings up from the bore hole 16 to the surface.

In one or more embodiments, the MWD system 160 may include a pulser sub, a pulser driver sub, a battery sub, a central storage unit, a master board, a power supply sub, a directional module sub, and other sensor boards. In some embodiments, some of these devices may be located in other areas of the BHA 150. One or more of the pulser sub and pulser driver sub may communicate with the pulser 300, which may be located below the MWD system 160. The MWD system 160 can transmit data to the pulser 300 so that the pulser 300 generates pressure pulses.

The non-magnetic drill collar houses the MWD system 160, which includes a package of instruments for measuring inclination, azimuth, well trajectory (bore hole trajectory), etc. The nuclear logging tool 200 and associated electronic components may be located in LWD instrument sub 165. The nuclear logging tool 200 and other well logging instruments may be electrically or wirelessly coupled together, powered by a battery pack or a power generator driven by the drilling fluid. All information gathered may be transmitted to the surface via in the form of pressure pulses generated by the pulser 300 through the mud column in the drill string.

The near-bit measurement sub 175 may be disposed between the downhole motor 170 and drill bit 180. The nuclear logging tool 200 may alternatively been installed in the near-bit measure sub 175 to provide more accurate real-time formation parameters to guide directional drilling. The data may be transmitted through the cable embedded in the downhole motor 170 to the MWD system 160 in the bottom whole assembly 150.

Figure 7:
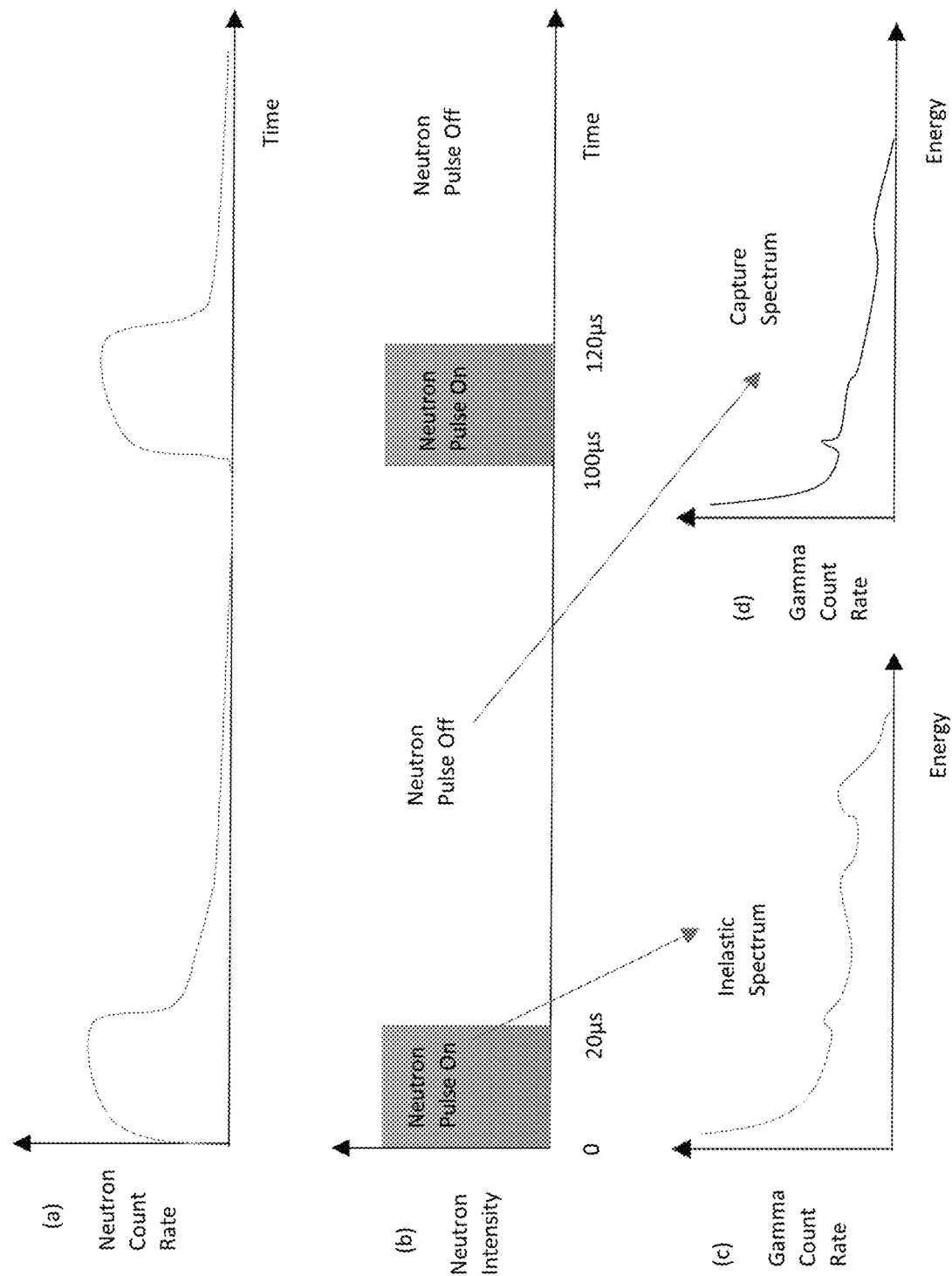
FIG. 7 shows schematics of neutron pulses, neutron count rates, as well as inelastic spectrum and capture spectrum of neutron-induced gamma rays.

In one embodiment of the current disclosure, a variety of formation parameters obtained using a logging tool having a D-T neutron generator and three dual-function detectors. FIG. 7 shows schematics of neutron pulses, neutron count rates, as well as inelastic spectrum and capture spectrum of neutron-induced gamma rays. The frequency of neutron pulses is 10 kHz (the period is 100 μs) and the neutron duty time is 20 μs, as shown in FIG. 7, panel (b).

The neutron count rates measured from each of the three detectors, shown in FIG. 7, panel (a), are utilized to obtain formation porosity. Neutrons from three detectors may be further separated according to whether the neutron pulse is ON or OFF, which serves as a coincident or anti-coincident signal to neutrons from the three detectors so that during the neutron pulses (neutron pulse is ON), neutrons are recorded mainly as fast neutrons. Between the neutron pulses (neutron pulse is OFF), neutrons are recorded as thermal neutrons. Fast neutrons and thermal neutrons recorded at three detectors can be used to obtain fast neutron space distribution and thermal neutron space distribution. The neutrons from each detector may also be recorded together. In that case, all neutrons (from thermal neutrons to fast neutrons) are used to obtain the neutron space distribution.

Gamma rays from three detectors may be further separated according to whether the neutron pulse is ON or OFF, which serves as a coincident or anti-coincident signal to gamma rays from the three detectors so that during the neutron pulses (neutron pulse is ON), gamma rays are mainly recorded as inelastic spectrum, shown in FIG. 7, panel (c). Between the neutron pulses (neutron pulse is OFF), gamma rays are recorded as capture spectrum, shown in FIG. 7, panel (d). Proper time windows are selected so that gamma rays measured in the capture time window are from thermal neutron capture reactions and most gamma rays measured in the inelastic time window are from fast neutron inelastic scattering.

Backgrounds at detectors may be measured while the neuron generator is OFF for some time and can be subtracted from the total signals of either neutrons or gamma rays. Neutron background measured during the neutron pulses may be further subtracted to get "pure" fast neutrons by using a small percentage of the measured neutrons between the neutron pulses. Similarly, the capture gamma rays measured during the neutron pulses may be further subtracted to get "pure" inelastic spectrum by using a small percentage of the measured capture spectrum between neutron pulses.

Gamma rays detected by each detector can also be recorded in one energy spectrum (e.g., a total energy spectrum), regardless whether they are initiated from neutron inelastic scattering or neutron capture reactions. In this way, several formation measurements are feasible, such as the formation porosity, elemental concentrations, and formation oil/gas saturation, but one may not be able to get formation density, as the spectrum of inelastic gamma rays are needed to obtain the formation density for a D-T pulsed neutron generator-based measurement system.

Figure 8:
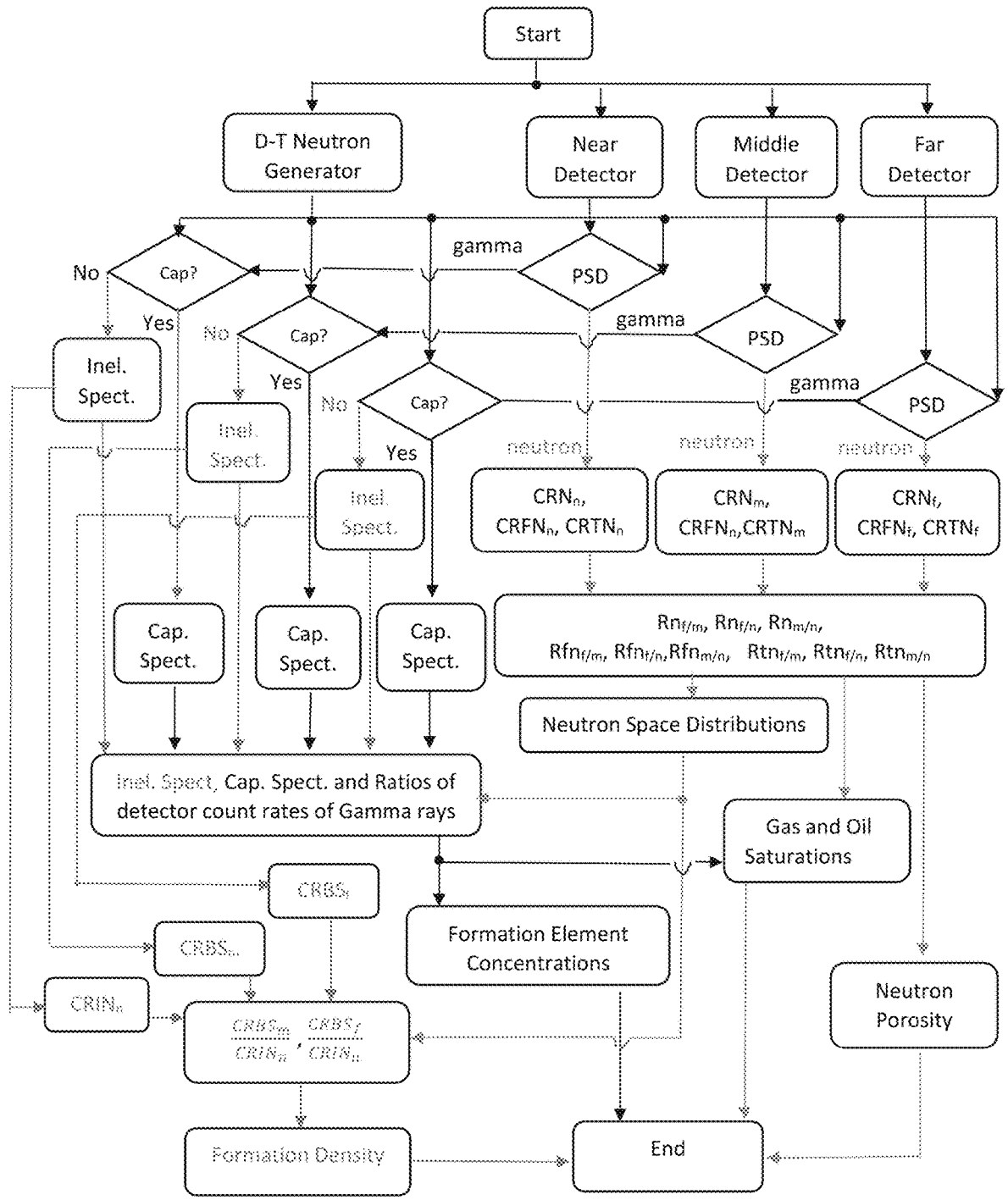
FIG. 8 is a flow diagram showing exemplary methods to obtain various formation parameters.

FIG. 8 is an exemplary workflow showing the steps in the processing of data from the logging tool 200 having one D-T neutron generator and three detectors—the near detector, the middle detector, and the far detector. First, signals of from neutrons and neutron-induced gamma rays from three detectors are distinguished using a pulse shape discrimination (PSD) technique. The neutron signals from the three detectors are then utilized to obtain the total count rates ($CRN_n$, $CRN_m$, $CRN_f$), fast neutron count rates ($CRFN_n$, $CRFN_m$, $CRFN_f$), thermal neutron count rates ($CRTN_n$, $CRTN_m$, $CRTN_f$), which are further utilized to obtain the neutron porosity by using three ratios ($Rn_{f/m}$, $Rn_{f/n}$, $Rn_{m/n}$), and fast neutron distribution (e.g., $Rfn_{f/m}$, $Rfn_{f/n}$, $Rfn_{m/n}$) and thermal neutron distribution (e.g., $Rtn_{f/m}$, $Rtn_{f/n}$, $Rtn_{m/n}$).

The fast neutron space distribution and thermal neutron space distribution may be utilized in the calculation of formation element concentrations using inelastic spectrum and capture spectrum. They may also be utilized to obtain more accurate oil and gas saturations. Examples for obtaining formation porosity, density, element concentrations, as well as gas and oil saturations are provided below.

As shown in FIG. 8, the count rates of neutrons (CRN) measured during and between neutron pulses from the near detector, the middle detector, and the far detector ($CRN_n$, $CRN_m$, $CRN_f$) are utilized to obtain the formation porosity ($\phi$) by using the ratios of the count rates.

The far-to-middle ratio ($Rn_{f/m}$), the far-to-near ratio ($Rn_{f/n}$) and the middle-to-near ratio ($Rn_{m/n}$) can be obtained by using Equations 1, 2, and 3, respectively. Since the three detectors are placed at different distances from the neutron source, they have different depth of investigations. As a result, near-wellbore environments, such as borehole fluid, cement, etc., have different impacts on the three ratios. The $Rn_{f/m}$ is more sensitive to the formation, $Rn_{m/n}$ is more sensitive to the near-wellbore changes and $Rn_{f/m}$ is sensitive to both.

$$Rn_{f/m} = \frac{CRN_f}{CRN_m} \tag{1}$$

$$Rn_{f/n} = \frac{CRN_f}{CRN_n} \tag{2}$$

$$Rn_{m/n} = \frac{CRN_m}{CRN_n} \tag{3}$$

The formation porosity $\phi_n$ can be obtained by first using $Rn_{m/n}$ and/or $Rn_{f/n}$ to correct $Rn_{f/m}$, and then use the corrected far-to-middle ratio $Rnc_{f/m}$ to obtain the formation porosity for a specific formation, e.g., sandstone, limestone or dolomite. Equations (4)-(6) illustrate this algorithm, $\Delta R$ being the correction value.

$$Rnc_{f/m} = Rn_{f/m} + \Delta R \tag{4}$$

$$\Delta R = f_1(Rn_{f/m}, Rn_{f/n}, Rn_{m/n}) \tag{5}$$

$$\Phi_n = f_2(Rnc_{f/m}) \tag{6}$$

The formation porosity $\Phi_n$ may also be obtained using the three ratios of count rates of capture gamma rays count rates obtained by the three detectors, according to an algorithm similar to that described in Equations 1-6.

The formation porosity $\Phi_n$ may also be obtained by combining the two porosities obtained by neutrons and capture gamma rays, respectively. Or obtained directly from the three ratios of neutrons and three ratios of capture gamma rays using other methodologies.

Mineralogy measurement can be obtained by measuring the energy spectrum of gamma rays from both neutron inelastic scattering and neutron capture reactions, using the same tool.

The gamma rays detected by each detector may be recorded either in two separate spectra (inelastic spectrum and capture spectrum) or in one spectrum (a total spectrum). In either case, the elements can be identified, relative yields of characteristic gamma rays from those elements can be obtained, so as the element concentrations.

Since the three detectors in the logging tool 200 detect both neutrons and gamma rays simultaneously at three different locations, one may obtain a more precise neutron space distributions (both fast neutron space distribution and thermal neutron space distribution) using the neutron count rates from three detectors. The measured neutron space distributions can then be utilized to get a more accurate calculation of the concentrations of elements such as C, O, H, Cl, Si, etc.

The count rates of backscattered inelastic gamma rays from the middle detector and the far detector ($CRBS_m$, $CRBS_f$) can be used to obtain apparent middle density ($\rho_{am}$) and apparent far density ($\rho_{af}$), after $CRBS_m$ and $CRBS_f$ are compensated by total initial inelastic gamma rays count rate ($CRIN_n$) obtained from the near detector, for example, according to Equations 7 and 8. The two apparent densities can then be used to obtain the true formation density ($\rho_t$), using equations 11 and 12 as an example.

$$\rho_{am} = \frac{1}{\alpha_m} \ln\left(\frac{\beta_m}{\frac{CRBS_m}{CRIN_n}}\right) \tag{7}$$

-continued $$\rho_{af} = \frac{1}{\alpha_f} \ln\left(\frac{\beta_f}{\frac{CRBS_f}{CRIN_n}}\right) \quad (8)$$

$$\rho_t = \rho_{af} + \Delta\rho \quad (11)$$

$$\Delta\rho = f(\rho_{am}, \rho_{af}) \quad (12)$$

$\alpha_m$, $\rho_m$, $\alpha_f$, $\beta_f$ are calibration parameters for the middle detector and the far detector, respectively.

Formation gas saturation measurement can also be obtained using the logging tool 200. Fast neutrons emitted from a neutron source in a tool are quickly slowed down to thermal neutrons by formation. Hydrogen is most effective in slowing down fast neutrons. Some thermal neutrons are captured by formation elements and capture gamma rays are initiated. Both thermal neutrons and capture gamma rays may be scattered back to the three detectors and get detected.

The count rates at detectors are highly dependent upon downhole formation pores, which are filled by gas, oil, water, or their mixture. All of them are rich in hydrogen. While water and oil have about same hydrogen atomic densities, gas has much lower hydrogen atomic density. As a result, the further away a detector from the neutron source, the detector is more sensitive to gas saturation change. When gas saturation increases, there will be more thermal neutrons and therefore more capture gamma rays at detectors. And the increases of thermal neutrons or capture gamma rays are more in the far detector than in the near detector. Therefore, by utilizing either the ratio of thermal neutron count rate ($Rtn_{n/f}$) or the ratio of capture gamma ray count rate ($Rg_{n/f}$) from the near and far detectors, together with formation porosity ($\phi$), one can obtain the formation gas saturation.

As the near detector and the far detector in tool 200 can detect both thermal neutrons and capture gamma rays and separate each other, one can obtain the ratio of count rates of thermal neutrons ($Rt_n$) at the two detectors, as well as the ratio of count rates of the capture gamma rays ($R_g$) at the two detectors. From them two apparent gas saturations, namely, $Sg_n$ from thermal neutrons and $Sg_g$ from capture gamma rays, the true gas saturation Sg can be obtained independently. The true gas saturation is a function of $Sg_n$ and $Sg_g$. The exemplary algorithm to obtain formation gas saturation is summarized in Equations 13 through 15.

$$Sg_n = f_1(Rtn_{n/f}, \Phi) \quad (13)$$

$$Sg_g = f_2(Rg_{n/f}, \Phi) \quad (14)$$

$$Sg = f_3(Sg_n, Sg_g) \quad (15)$$

Oil saturation can also be obtained using the ratio of count rates of fast neutron inelastic gamma rays from carbon and oxygen (C/O ratios) in the formation. The gamma rays form fast neutron inelastic scattering on carbon and oxygen can be obtained by fitting and stripping the gamma ray spectra from either the inelastic spectrum or the total spectrum. The neutron source can be either a D-T neutron generator, operated in either pulsed mode or in continuous mode or an isotope neutron source, such as Am—Be, Pu—Be, Cf-252 etc.

An exemplary algorithm calculates the apparent oil saturations from the three detectors—$So_n$, $So_m$, $So_f$ is shown by using Equations 16 through 18, respectively. The apparent oil saturations can be used to obtain the corrected oil saturation (So) using Equation 19.

$$So_n = f_1(Rg_{n,c/o}, \Phi) \quad (16)$$

$$So_m = f_2(Rg_{m,c/o}, \Phi) \quad (17)$$

$$So_f = f_3(Rg_{f,c/o}, \Phi) \quad (18)$$

$$So = f_4(So_n, So_m, So_f) \quad (19)$$

The corrected oil saturation may also be obtained by using the C/O ratios ($Rg_{n,c/o}$, $Rg_{m,c/o}$, $Rg_{f,c/o}$), formation porosity ($\phi$) and fast neutron space distribution ($Rfn_{f/m}$, $Rfn_{f/n}$, $Rfn_{m/n}$) from the three directors, shown in Equation $$So = f_5(Rg_{n,c/o}, Rg_{m,c/o}, Rg_{f,c/o}, \Phi, Rfn_{f/m}, Rfn_{f/n}, Rfn_{m/n}) \quad (20)$$

While in the foregoing specification this disclosure has been described in relation to certain preferred embodiments thereof, and many details have been set forth for purpose of illustration, it will be apparent to those skilled in the art that the disclosure is susceptible to alteration and that certain other details described herein can vary considerably without departing from the basic principles of the disclosure. In addition, it should be appreciated that structural features or methodologies shown or described in any one embodiment herein can be used in other embodiments as well.

What is claimed is:

1. A nuclear logging tool, comprising:
    a housing, two or more neutron sources, one or more shields, and two or more detectors disposed about the housing,
    wherein the two or more neutron sources include a first neutron source and a second neutron source, each configured to generate neutrons in pulses or continuously and each of the two or more detectors is operable to detect neutrons and gamma rays,
    wherein the two or more detectors include a first detector disposed at a first distance from a first neutron source and a second detector disposed at a second distance from the first neutron source, wherein the first distance is shorter than the second distance,
    wherein each of the first distance and the second distance is in a longitudinal direction of the housing, and
    wherein each shield is operable to absorb neutrons and gamma rays and is disposed inside the housing between one of the two or more neutron sources and one of the two or more detectors,
    wherein the second neutron source is spaced away from the first neutron source in the longitudinal direction of the housing, and the two or more detectors are disposed between the first neutron source and the second neutron source.

2. The nuclear logging tool of claim 1, wherein each of the two or more neutron sources is independently a Deuterium-Tritium (D-T) neutron generator, a Deuterium-Deuterium (D-D) neutron generator, or a radioisotope neutron source.

3. The nuclear logging tool of claim 1, further comprises a third detector disposed at a third distance from the first neutron source in the longitudinal direction of the housing, and the third distance is larger than the second distance.

4. The nuclear logging tool of claim 1, wherein each of the two or more detectors comprises a scintillator made of $Cs_2LiYCl_6$ or $Cs_2LiLaBr_6$.

5. The nuclear logging tool of claim 1, wherein the two or more neutron sources include an isotope neutron source and a pulsed neutron generator.

6. The nuclear logging tool of claim 1, wherein at least two of the two or more detectors are installed at different radial directions about the housing and have different toolface angles when the nuclear logging tool is deployed in a subterranean formation.

7. The nuclear logging tool of claim 6, wherein at least one of the two or more detectors is located on an axis or off the axis of the logging tool.

8. The nuclear logging tool of claim 1, wherein the shield is made of a material selected from gadolinium (Gd), samarium (Sm), tungsten borides, an alloy containing Gd, an alloy containing Sm, $Gd_2O_3$, $Sm_2O_3$, $B_2O_3$, and mixtures thereof.

9. The nuclear logging tool of claim 8, wherein a portion of a casing of at least one among the two or more detectors is made of the shield material.

10. A method for measuring subterranean formation properties, comprising:
deploying the nuclear logging tool of claim 1 into a subterranean formation;
causing the two or more neutron sources to emit neutrons into the subterranean formation;
converting neutrons and gamma rays from the subterranean formation received by the two or more detectors to electric signals; and
analyzing electric signals to obtain a plurality of formation properties.

11. The method of claim 10, wherein the plurality of formation properties include formation density, formation porosity, gas and oil saturation, and/or formation element concentration.

12. A downhole drilling system, comprising:
a drill string having a bottom hole assembly (BHA) disposed at a lower part thereof;
a kelly drive configured to deliver the drill string into a borehole;
a top drive configured to rotate the drill string; and
a controller,
wherein the BHA comprises a drill bit disposed at an end portion of the BHA, a downhole motor, and a measurement sub configured to measure subterranean formation properties and operational parameters, wherein the measurement sub comprises the nuclear logging tool of claim 1.

13. The drilling system of claim 12, wherein each of the two or more neutron sources in the nuclear logging tool is independently a Deuterium-Tritium (D-T) neutron generator, a Deuterium-Deuterium (D-D) neutron generator, or a radioisotope neutron source.

14. A wireline logging tool, comprising the nuclear logging tool of claim 1 connected to an electric cable.

* * * * *